United States Patent
Park

(10) Patent No.: US 7,742,540 B2
(45) Date of Patent: Jun. 22, 2010

(54) METHOD AND DEVICE FOR DATA PROCESSING IN A WIRELESS MOBILE TERMINAL

(75) Inventor: Sung-Chul Park, Seoul (KR)

(73) Assignee: Samsung Electronic Co., Ltd., Suwon-si (KR)

(*) Notice: Subject to any disclaimer, the term of this patent is extended or adjusted under 35 U.S.C. 154(b) by 788 days.

(21) Appl. No.: 11/653,353

(22) Filed: Jan. 16, 2007

(65) Prior Publication Data

US 2008/0025434 A1    Jan. 31, 2008

(30) Foreign Application Priority Data

Jul. 25, 2006   (KR) .................. 10-2006-0069828

(51) Int. Cl.
   *H04L 27/00*   (2006.01)
(52) U.S. Cl. .................................... 375/296
(58) Field of Classification Search ............ 375/259, 375/260, 278, 284, 285, 295, 296, 316, 324, 375/340, 346, 347, 349, 350; 455/73, 74.1, 455/114.2, 114.3, 115.1, 117, 130, 131; 398/193
See application file for complete search history.

(56) References Cited

U.S. PATENT DOCUMENTS 7,199,706 B2 * 4/2007 Dawson et al. ............. 340/538

| 2002/0159512 | A1* | 10/2002 | Matsumoto | 375/222 |
|---|---|---|---|---|
| 2006/0061329 | A1* | 3/2006 | Dawson | 320/115 |
| 2006/0121933 | A1* | 6/2006 | Ikeda | 455/550.1 |
| 2006/0165117 | A1* | 7/2006 | Iwamura | 370/464 |
| 2007/0184874 | A1* | 8/2007 | Ikeda | 455/553.1 |

FOREIGN PATENT DOCUMENTS

| JP | 2001-0112069 | 4/2001 |
|---|---|---|
| KR | 2001-19407 | 3/2001 |

* cited by examiner

*Primary Examiner*—Sam K Ahn
(74) *Attorney, Agent, or Firm*—Roylance, Abrams, Berdo & Goodman, L.L.P.

(57) ABSTRACT

Provided are a method and device for processing data by coupling data with a power line, in which the data was processed through a plurality of lines in a wireless mobile terminal. The data processing device includes a data transmitter for converting parallel data into serial data, RF modulating the serial data, and coupling the RF modulated serial data with an electrical power line to which electricity is applied; a data output unit for separating the electricity and the RF modulated serial data, RF demodulating the separated RF modulated serial data, converting the RF demodulated data into converted parallel data, and outputting the converted parallel data; and a controller for controlling the data transmitter and the data output unit, and for controlling the data transmission between the data transmitter and the data output unit.

10 Claims, 2 Drawing Sheets

METHOD AND DEVICE FOR DATA PROCESSING IN A WIRELESS MOBILE TERMINAL

CROSS-REFERENCE TO RELATED APPLICATION

This application claims the benefit under 35 U.S.C. §119(a) of an application entitled "Method and Device for Data Processing In a Wireless Mobile Terminal" filed with the Korea Intellectual Property Office on Jul. 25, 2006 and assigned Serial No. 2006-69828, the entire contents of which is hereby incorporated by reference.

BACKGROUND OF THE INVENTION

1. Field of the Invention

The present invention relates to a wireless mobile terminal. More particularly, the present invention relates to a method and device for processing data using a single electrical power line, instead of a plurality of electrical power lines.

2. Description of the Related Art

A wireless mobile terminal is now a ubiquitous communications tool. As wireless mobile terminals have evolved two trends have emerged. The trends include an increase in the number of functions for a wireless mobile terminal and a reduction in the size of a wireless mobile terminal. However, an increase in the functions embodied in a wireless mobile terminal results in an increase in the number of data transmission lines needed to process data. As a result, the plurality of data transmission lines may hamper the ability to reduce the size of the wireless mobile terminal. Further, the additional data transmission lines reduce the reliability of the wireless mobile terminal.

Accordingly, there is a need to be able to process data using a reduced number of data transmission lines. A reduction in the number of data transmission lines would allow for a further reduction in the size of the wireless mobile terminal, would increase the reliability of the wireless mobile terminal and would result in a reduction in the manufacturing cost of wireless mobile terminal by simplifying the manufacturing process.

SUMMARY OF THE INVENTION

Exemplary embodiments of the present invention address at least the above problems and/or disadvantages and provide at least the advantages described below. Accordingly, an aspect of an exemplary embodiment of the present invention is to provide a device and method for processing data using a single power line, instead of a plurality of power lines.

According to an aspect of an exemplary embodiment of the present invention, there is provided a device for processing data in a wireless mobile terminal. The device includes a data transmitter for converting parallel data into serial data, RF modulating the serial data, and coupling the RF modulated serial data with an electrical power line to which electricity is applied; a data output unit for separating the electricity and the RE modulated serial data, RF demodulating the separated RF modulated serial data, converting the RF demodulated data into converted parallel data, and outputting the converted parallel data; and a controller for controlling the data transmitter and the data output unit, and for controlling the data transmission between the data transmitter and the data output unit.

According to another aspect of an exemplary embodiment of the present invention, there is provided a method for processing data in a wireless mobile terminal. The method includes converting parallel data into serial data, RF modulating the serial data, and coupling the RF modulated serial data with an electrical power line to which electricity is applied, by a data transmitter; transmitting the RF modulated serial data coupled with the electrical power line to a data output unit; and separating the electricity and the RF modulated serial data from the electrical power line, RF demodulating the separated RF modulated serial data, converting the RF demodulated serial data into converted parallel data, and outputting the converted parallel data, by the data output unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
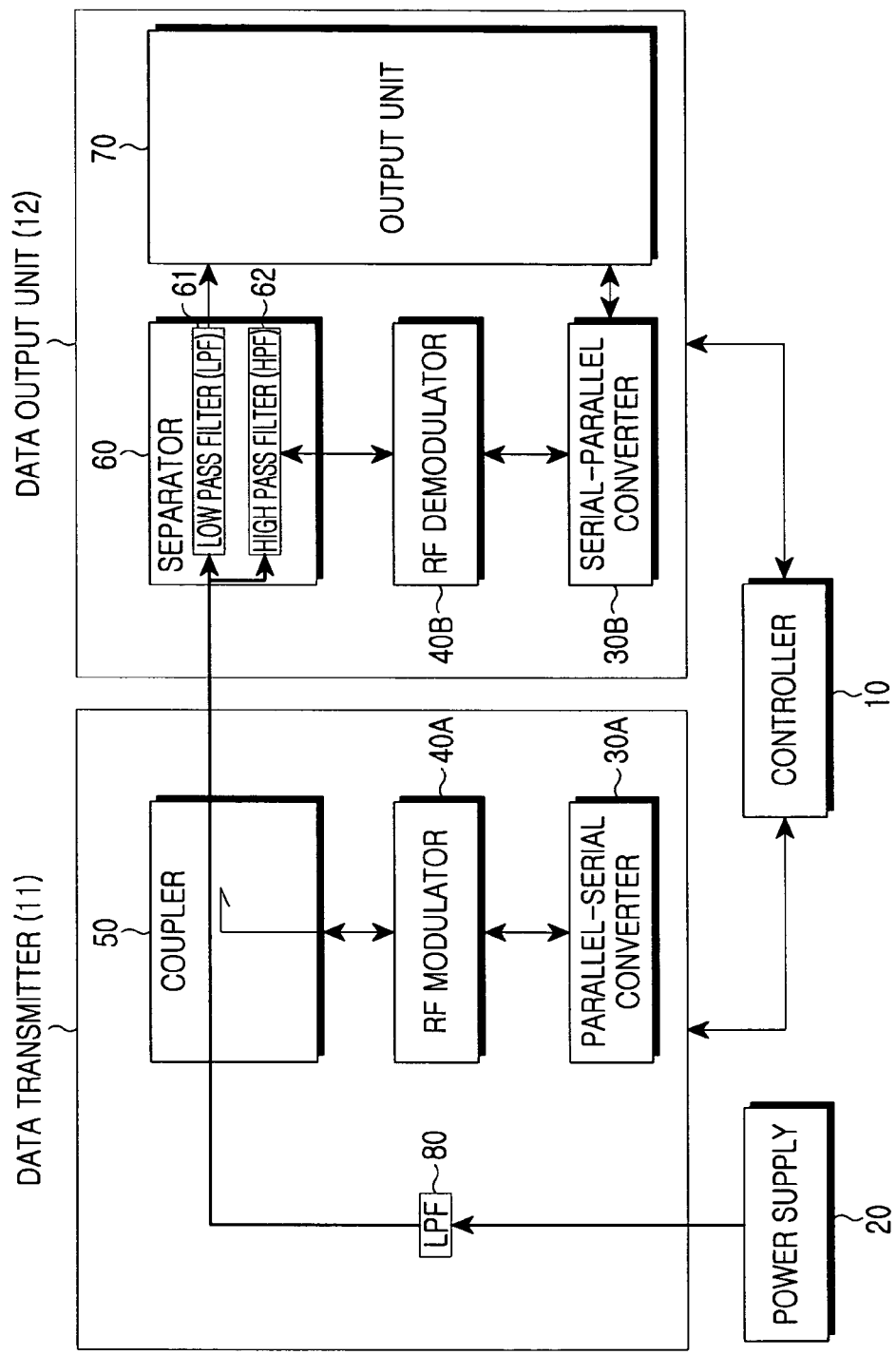
FIG. 1 is a block diagram illustrating a wireless mobile terminal for data processing according to an exemplary embodiment of the present invention.

FIG. 1 is a block diagram illustrating a wireless mobile terminal for data processing according to an exemplary embodiment of the present invention. Referring to FIG. 1, the wireless mobile terminal according to an exemplary embodiment of the present invention generally includes a controller 10, a data transmitter 11, and a data output unit 12, which will be described below.

An electrical power source 20 is necessary for driving the wireless mobile terminal, and includes a battery or an external power source for the wireless mobile terminal.

The data transmitter 11 couples the processing data with the electrical power source after carrying out processes for converting and modulating data, and then transmits the data coupled with the electrical power source to the data output unit 12. The data transmitter 11 includes a parallel-serial converter 30A, an RF modulator 40A, and a coupler 50, which will be described below.

The parallel-serial converter 30A converts parallel data into serial data. The parallel-serial converter 30A according to an exemplary embodiment of the present invention converts the parallel data into the serial data that is necessary for a serial-parallel converter 30B.

The RF modulator 40A performs RF modulation of the serial data from the parallel-serial converter 30A. In order to RF-modulate the serial data, the RF modulator 40A according to the exemplary embodiment of the present invention, encodes data and performs RF modulation of the encoded data. The RF modulated or RF demodulated signal is described below with relation to a separator 60. Here, orthogonal frequency division multiplexing (OFDM) is used for the RF modulation to maximize the efficiency of data transmission.

The coupler 50 couples the RF modulated serial data from the RF modulator 40A with the electrical power line to which electricity is applied. In doing so, the coupler 50 according to an exemplary embodiment of the present invention, up-converts the frequency of the RF modulated serial data and/or amplifies the up-converted RF modulated serial data. Alternatively, RF modulator 40A may perform the up-conversion and/or amplification. The serial data, which has been up-converted and/or amplified, is then coupled with the electrical power line to which electricity is applied from the power supply 20. A low pass filter (LPF) 80 may be disposed in electrical power line between the power supply 20 and coupler 50.

The data output unit 12 separates the serial data transmitted via the electrical power line into electricity and serial data, and outputs the separated serial data. The data output unit 12 includes a separator 60, an RF demodulator 40B, a serial-parallel converter and an output unit 70, which will be described below.

The separator 60 separates the electricity and data from the electrical power line. Specifically, the separator 60 according to an exemplary embodiment of the present invention couples the electrical power line, which comprises the electricity and data, with a LPF 61 and high pass filter (HPF) 62. When the electrical power line is coupled with the LPF, the data from a high frequency band is filtered, thereby substantially passing only the electricity. Also, when the electrical power line is coupled to the HPF, the electricity of a low frequency band is filtered, thereby substantially passing only the serial data. The HPF passes substantially the same frequency band that is utilized for both the modulation by the RF modulator 40A and the demodulation by the following RF demodulator 40B. After the electricity and data are separated from each other, the separated electricity is provided for the output unit 70, the data is low-noise-amplified and/or frequency down-converted by the separator 60, and transmitted to a RF demodulator 40B. Alternatively, RF demodulator 40B may perform the low-noise-amplification and/or frequency down-conversion.

The RF demodulator 40B demodulates and decodes the data from the separator 60.

The serial-parallel converter 30B converts the serial data into the parallel data.

The output unit 70 operates with the electrical power source from the separator 60, and outputs the data from the serial-parallel converter 30B. According to the various exemplary embodiments of the present invention, the output unit 70 may be a display unit or an audio output unit of the wireless mobile terminal. The display unit, which may be a Liquid Crystal Display (LCD) or an Organic Light Emitting Diodes (OLED), outputs the various display information for the wireless mobile terminal. In the case where a touch screen type LCD or OLED is employed as the display unit, the display unit may operate as an input unit that controls the wireless mobile terminal. If the audio output unit which outputs audio signals contains a microphone, the audio output unit is able to operate as a recorder which stores the external audio signals.

The controller 10 converts and controls the overall operations and driving modes of the wireless mobile terminal. The controller 10 according to an exemplary embodiment of the present invention controls the data transmitter 11 to couple the electrical power line with data, and transmits them to the data output unit 12. Thereafter, the controller 10 controls the data output unit 12 to separate the electricity and the data from each other, and outputs the separated data.

In an exemplary embodiment of the present invention described with reference to the FIG. 1, even though it is assumed that the data is transmitted from the data transmitter 11 to the data output unit 12, the data can be transmitted in a reverse direction. That is, if the output unit 70 is either a touch screen type of display unit or an audio output unit includes a microphone, the data may be transmitted from the data output unit 12 to the data transmitter 11. For the purpose of the transmission, in the wireless mobile terminal according to an exemplary embodiment of the present invention, the data transmitter 11 is able to share each component of the data output unit 12, and the data output 12 also can share each component of the data transmitter 11. For example, if there is an input through the touch screen of the display unit, the data output unit 12 may include a converter (for instance, parallel-serial converter or serial-parallel converter), an RF modulator and a coupler for transmitting the input to the data transmitter 11 to process. Similarly, the data transmitter 11 may include the converters, an RF demodulator and a separator.

Figure 2:
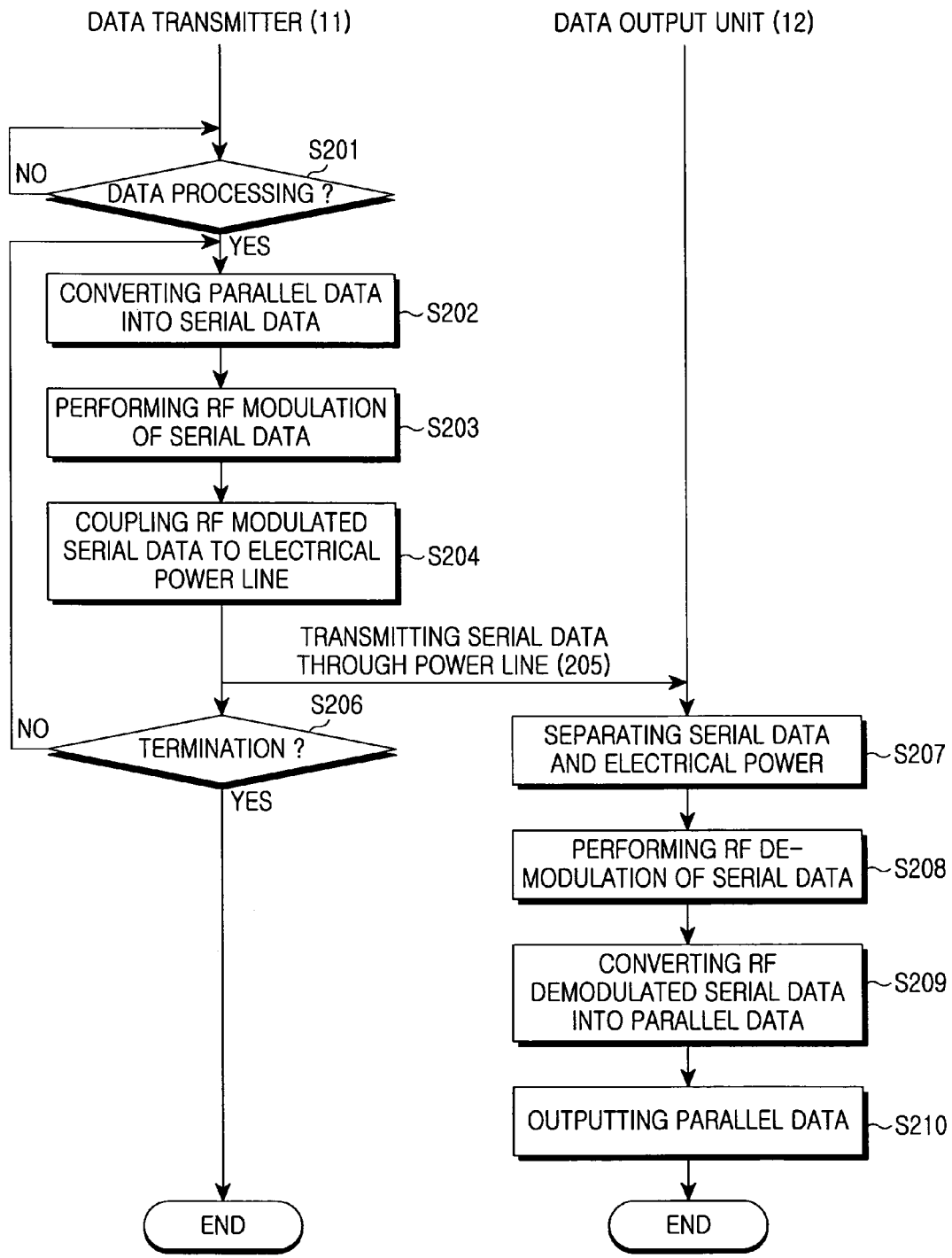
FIG. 2 is a flowchart illustrating data processing according to an exemplary embodiment of the present invention.

FIG. 2 is a flowchart illustrating data processing according to an exemplary embodiment of the present invention. In an exemplary embodiment of the present invention as illustrated in FIG. 2, it is assumed that the structure of data to be processed is that of parallel data and the structure of data requested by the output unit 70 is also that of parallel data. Hereinafter, the data process according to an exemplary embodiment of the present invention will be described below.

If the data process is requested (step S201), the controller 10 converts the parallel data to be processed into serial data (step S202).

If the data to be processed is parallel data, the controller 10 enables the parallel-serial converter 30A to convert the parallel data into serial data. The data to be processed refers to the data structure (serial or parallel) used by the output unit 70 which is described below. Therefore, step S202 may be omitted according to the structure of the data to be processed. For instance, if the data to be processed is serial data, the controller 10 omits the step S202 and proceeds to step S203 in which RF modulation of the data is performed.

The controller 10 controls the RF modulation of the serialized data from step S202 (step S203). The controller 10 may also control the conversion of the parallel data into the serial data and the encoding of the serial data, and RF-modulation the encoded serial data. Here, the frequency of the RF modulation is supposed to be substantially the same as the frequency of a high pass filter (HPF) of separator 60, which is described below.

Then, the controller 10 controls the coupling of the RF modulated serial data with the electrical power line to which electricity is applied (step 204), and the transmission of the electricity and the serial data through the electrical power line (step S205).

The controller 10 controls the up-conversion and amplification of the RF modulated serial data, and then controls the coupling of the serial data, which is up-converted and amplified, with the electrical power line to which electricity is applied. Here, the electricity, which is applied to the electrical power line, may be a DC electrical power, and the electricity may have passed through a low pass filter (LPF) of a switching mode power supply (SMPS). After controlling the coupling the electricity with the serial data, the controller 10 controls the transmission of the electricity and the serial data to a separator 60 through the electrical power line.

The controller 10 repeats step S202 to step S204 until the data process is terminated (step 206). At this time, the wireless mobile terminal according to an exemplary embodiment of the present invention may include a buffer memory in consideration of the difference of processing speed between the data input unit 11 and the data output unit 12.

When the electricity and the serial data have been transmitted to the separator through the electrical power line, the controller 10 controls the separation of the coupled power supply and the serial data (step S207).

When the electricity and the serial data have been transmitted to the separator through the electrical power line, the controller 10 controls the electrical power line to be coupled to the LPF 61 and HPF 62. That is, the controller 10 controls so as to substantially remove the serial data coupled with the electrical power line by coupling the electrical power line with the LPF 61. Thereby, the electricity is substantially only provided. Similarly, the controller 10 controls the extraction of substantially only the serial data without the electricity by coupling the electrical power line pass with the HPF 62. Then, the controller 10 controls the low-noise-amplification and frequency-down-conversion for the separated serial data, and the transmission of the data to an RF demodulator 40B.

The controller 10 controls the RF demodulation of the separated serial data (step S208), and the conversion of the RF modulated serial data into parallel data (step S209).

The controller 10 controls the RF demodulation, in other words, the serial data which has passed through from step S201 to step S207 is demodulated and decoded, and the RF demodulated data is then converted into parallel data to recover the parallel data. The parallel data generated from the RF demodulation is the same as the parallel data prior to the conversion of the serial data in step S202.

Then, the controller 10 controls the transmission of the RF demodulated parallel data to an output unit 70 to output it (step S210).

The controller 10 controls the transmission of the parallel data transmitted through the electrical power line by way of step S201 to step S209 to the output unit 70, and enables the output unit 70 to output them.

As described above, there are benefits obtained by an exemplary embodiments of the present invention.

By processing the data, which had been previously processed using a plurality of lines, using a single line, reliability of a wireless mobile terminal is increased, and manufacturing costs of the wireless mobile terminal is reduced due to the simplified the manufacturing process for the wireless mobile terminal.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A device for processing data in a wireless mobile terminal, the device comprising:
    a data transmitter for converting parallel data into serial data, RF modulating the serial data, and coupling the radio frequency (RF) modulated serial data with an electrical power line to which electricity is applied;
    a data output unit for separating the electricity and the RF modulated serial data, RF demodulating the separated RF modulated serial data, converting the RF demodulated data into converted parallel data, and outputting the converted parallel data; and
    a controller for controlling the data transmitter and the data output unit, and for controlling the data transmission between the data transmitter and the data output unit.

2. The device as claimed in claim 1, wherein the data transmitter comprises:
    a parallel-serial converter for converting the parallel data into the serial data;
    a RF modulator for RF modulating the serial data; and
    a coupler for up-converting and amplifying the RF modulated serial data, and coupling the up-converted and amplified serial data with the electrical power line to which electricity is applied.

3. The device as claimed in claim 1, wherein the data output unit comprises:
    a separator for separating the electricity and RF modulated serial data, and performing low-noise-amplification and down-conversion for the separated RF modulated serial data;
    an RF demodulator for performing RF demodulation of the low-noise amplified and frequency-down separated RF modulated serial data;
    a serial-parallel converter for converting the separated RF demodulated serial data into the converted parallel data; and
    an output unit for outputting the converted parallel data from the serial-parallel converter.

4. The device as claimed in claim 3, wherein the separator comprises a low pass filter (LPF) by which the electricity is separated and a high pass filter (HPF) by which the RF modulated serial data is separated.

5. The device as claimed in claim 3, wherein the output unit is a display unit of a wireless mobile terminal.

6. A method for processing data in a wireless mobile terminal, the method comprising:
    converting parallel data into serial data, radio frequency (RF) modulating the serial data, and coupling the RF modulated serial data with an electrical power line to which electricity is applied, by a data transmitter;
    transmitting the RF modulated serial data coupled with the electrical power line to a data output unit; and
    separating the electricity and the RF modulated serial data from the electrical power line, RF demodulating the separated RF modulated serial data, converting the RF demodulated serial data into converted parallel data, and outputting the converted parallel data, by the data output unit.

7. The method claimed in claim 6, wherein the output unit is a display unit of a wireless mobile terminal.

8. The method claimed in claim 6, wherein the electricity and the RF modulated serial data are separated from the electrical power line by a separator.

9. The method claimed in claim 8, wherein the separator comprises low pass filter (LPF) by which the electricity is separated and a high pass filter (HPF) by which the RF modulated serial data is separated.

10. The method as claimed in claim 8, further comprises:
    outputting the converted parallel data which was converted from the RF demodulated serial data.

* * * * *